United States Patent
Willey et al.

(10) Patent No.: US 7,833,495 B2
(45) Date of Patent: Nov. 16, 2010

(54) EXHAUST TREATMENT DEVICE FACILITATING THROUGH-WALL FLOW

(75) Inventors: Ray Willey, Redford, MI (US); Bret A. Zimmerman, Grosse Pointe Farms, MI (US); David J. Kubinski, Canton, MI (US); Diana D. Brehob, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 958 days.

(21) Appl. No.: 11/670,449

(22) Filed: Feb. 2, 2007

(65) Prior Publication Data

US 2007/0128088 A1 Jun. 7, 2007

Related U.S. Application Data

(63) Continuation-in-part of application No. 11/123,903, filed on May 6, 2005, now abandoned.

(51) Int. Cl.
*B01D 50/00* (2006.01)
(52) U.S. Cl. .................................................. 422/180
(58) Field of Classification Search ................ 422/168, 422/177, 180
See application file for complete search history.

(56) References Cited

U.S. PATENT DOCUMENTS

| | | | |
|---|---|---|---|
| 4,127,691 A | 11/1978 | Frost | |
| 4,448,833 A * | 5/1984 | Yamaguchi et al. | 428/116 |
| 4,512,786 A | 4/1985 | Sakurai et al. | |
| 4,531,363 A | 7/1985 | Ludecke | |
| 4,559,193 A | 12/1985 | Ogawa et al. | |
| 4,669,261 A * | 6/1987 | Worner et al. | 60/297 |
| 4,704,863 A | 11/1987 | Abthoff | |
| 4,906,443 A | 3/1990 | Gandhi et al. | |
| 5,403,559 A * | 4/1995 | Swars | 422/180 |
| 5,727,385 A | 3/1998 | Hepburn | |
| 5,820,832 A | 10/1998 | Huttenhofer et al. | |
| 6,165,430 A | 12/2000 | Kudia et al. | |
| 6,287,524 B1 | 9/2001 | Hums et al. | |
| 6,516,610 B2 | 2/2003 | Hodgson | |

(Continued)

FOREIGN PATENT DOCUMENTS

EP 0073634 B1 10/1986

(Continued)

*Primary Examiner*—Tom Duong
(74) *Attorney, Agent, or Firm*—Julia Voutyras; Brooks Kushman P.C.

(57) ABSTRACT

An emissions treatment device includes a substrate having multiple parallel channels/layers of a porous material, the channels/layers including a first group of channels/layers at least partially open along their length from an upstream end to a downstream end, and a second group of channels/layers that are at least partially open at the downstream end and may be substantially blocked at an upstream end, the parallel channels having complementary geometries and/or sizes. Coated metallic fibers or fleece facilitates flow of exhaust through walls of the first group into the second group of channels. Flow diverters or scoops may be formed in the walls between the first and second groups of channels to divert exhaust flow from the first group to the second group of channels. Catalyzed mesh sheets may be supported by perforated stainless steel sheets containing small passages and/or scoops to complement the useful wallflow by structure and flow design.

15 Claims, 7 Drawing Sheets

U.S. PATENT DOCUMENTS

| | | |
|---|---|---|
| 6,625,975 B1 | 9/2003 | Stahl et al. |
| 6,761,025 B1 | 7/2004 | Gladden |
| 6,790,248 B2 | 9/2004 | Ishihara et al. |
| 7,008,461 B2 | 3/2006 | Kuki et al. |
| 7,229,597 B2 | 6/2007 | Patchett et al. |
| 2002/0073666 A1 | 6/2002 | Cutler et al. |
| 2002/0076523 A1 | 6/2002 | Ketcham |
| 2003/0185726 A1 | 10/2003 | Jobson et al. |
| 2004/0208803 A1 | 10/2004 | Bruck |
| 2004/0261384 A1 | 12/2004 | Merkel |
| 2006/0191248 A1* | 8/2006 | Bardhan et al. ............... 55/523 |

FOREIGN PATENT DOCUMENTS

| | | |
|---|---|---|
| EP | 1132585 A2 | 9/2001 |
| EP | 1164266 A2 | 12/2001 |
| EP | 1245801 A2 | 10/2002 |
| EP | 1450015 A1 | 2/2004 |
| EP | 1433519 A1 | 6/2004 |
| EP | 1217185 B1 | 1/2005 |
| EP | 1500799 A1 | 1/2005 |
| EP | 179109 A1 | 7/2006 |
| WO | 01/12320 A1 | 2/2001 |
| WO | 02/33232 A2 | 4/2002 |
| WO | 03/082426 A2 | 10/2003 |
| WO | 03/100225 A1 | 12/2003 |
| WO | 2004/011386 A1 | 2/2004 |

\* cited by examiner

EXHAUST TREATMENT DEVICE FACILITATING THROUGH-WALL FLOW

CROSS-REFERENCE TO RELATED APPLICATION

This application is a Continuation-In-Part of copending and commonly owned U.S. patent application Ser. No. 11/123,903 filed May 6, 2005.

BACKGROUND

1. Technical Field

The present disclosure relates to cell configurations for an exhaust treatment device for use with internal combustion engines.

2. Background Art

Achieving low emissions, particularly low NOx (NO, nitric oxide, plus $NO_2$, nitrogen dioxide) emissions from lean-burning engines, such as diesel engines is a challenge. SCRs (selective catalytic reductions)and LNTs (lean NOx traps) have been developed to treat NOx emitted from diesel engines. LNTs operate in a lean/rich cycle in which NOx is purged during lean operation and NOx is released and reacted in a shorter period of rich operation. A disadvantage of LNTs is that they significantly degrade diesel fuel economy. Although SCRs do not consume a large amount of extra fuel to react NOx, urea is supplied to the SCR to facilitate the reaction to treat NOx. For vehicular use, an onboard urea tank and delivery system is used.

While SCRs are very effective at converting NOx to $N_2$ and $O_2$ under steady state conditions, during transient conditions such as tip-ins (driver demand for a rapid increase in torque), a high concentration of NOx may pass through the SCR and may not be entirely reacted. SCRs have not achieved the extremely low NOx emission levels that have been achieved with gasoline engines using three-way catalysts, largely due to NOx slippage or breakthrough during transients. These NOx tip-in spikes are difficult to reduce due to slow kinetics and poor diffusion in the SCR device.

SUMMARY

An exhaust treatment device for an internal combustion engine includes a substrate for forming multiple parallel channels of a porous material, the channels including a first group of channels at least partially open on both upstream and downstream ends, and a second group of channels that are closed at one end of the substrate and at least partially open at the opposite end, the parallel channels having complementary geometries and/or sizes. The first group or primary channels may include coated metallic fibers or fleece to increase pressure in the primary channels and facilitate flow of exhaust through walls of the first group into the second group of channels. Alternatively, or in combination, flow diverters or scoops may be formed in the channel walls between the first and second groups of channels to divert a portion of the exhaust flow from the first group of channels to the second group of channels.

Embodiments include an exhaust treatment device having a layered substrate made of a thin metallic mesh with washcoated fibers or fleece interposed adjacent layers to facilitate trans-layer migration of exhaust flow through corresponding openings of the substrate mesh. The exhaust treatment device may include generally parallel substrate layers to form secondary channels or layers containing relatively fewer (or no) fibers per unit volume with reduced back pressure and greater flow velocities and primary channels containing relatively greater fiber density to increase surface area for chemical and physio adsorption, reduce flow velocities, and increase exhaust flow/fiber interaction with primary channels being at least partially open at both upstream and downstream ends. Secondary channels may also be open at both upstream and downstream ends, or may be substantially closed or blocked at one end. Various embodiments may include secondary channels that may be substantially closed or blocked using a washcoat material to partially or completely fill the secondary channels at one end and/or to provide flow restriction in the primary channels to increase through-wall flow of exhaust.

Embodiments may also include layers with a length that is more than 1.5 times greater than the diameter of the substrate. Embodiments may have the number of channels in the first group substantially the same as the number of channels in the second group, with the first and second groups having the same geometry, such as triangular or square cross-sectional geometries. The first and second groups of channels may have similar cross-sectional geometries of different size to improve the exhaust gas diffusion while minimizing effective back pressure. Alternatively, the number of channels in the first group may be greater than the number of channels in the second group with the first and second groups having a hexagonal cross-sectional geometry, for example. The channels may be square in cross section and each of the first group of channels may be adjacent to one or more members of the second group of channels.

In other embodiments, the channels may be tapered channels, in which case, the channels of the first group may decrease in cross-sectional area from an upstream end to a downstream end and the channels of the second group may increase in cross-sectional area from the upstream end to the downstream end, for example. A flow restrictor or other type of partial closure may be fitted at or near an outlet end of each channel in the first group of channels. The flow restrictor may comprise washcoat material that partially or completely obstructs flow.

The channels of the second group of channels may be evenly spaced across an end of the substrate.

The first group of channels may comprise an outer ring of the substrate and the second group of channels may comprise an inner portion of the substrate.

The substrate may be comprised of cordierite having 10 to 100 cells per square centimeter, may be comprised of silicon carbide, or may be comprised of a metallic mesh. The substrate material may have porosity greater than 10% prior to applying a washcoat material and may have porosity greater than 50%.

The first group of channels may have a washcoat and the second group of channels may be impregnated with washcoat materials. The substrate may be washcoated so as to render the substrate a LNT. Alternatively, the substrate may be washcoated so as to render the substrate a TWC. As yet another alternative, the substrate may be washcoated so as to render the substrate an oxidation catalyst. In other embodiments, the washcoat may be an acidic material capable of adsorbing a reductant and may render the substrate to be a SCR catalyst with the reductant being ammonia, for example. A solid acidic material may be deposited on a surface of the substrate to provide sites for urea reductant adsorption.

Embodiments of the exhaust treatment device may include a urea injector coupled to an exhaust of the engine upstream from the substrate. The device may further include an ammonia sensor coupled to the exhaust of the engine downstream of the substrate with an electronic control unit coupled to the engine, the urea injector, and the ammonia sensor, the electronic control unit being operable to control the urea injector based on an output from the ammonia sensor.

Embodiments also include a method of manufacturing an exhaust treatment device including forming two groups of parallel channels or layers with or in a porous substrate with the first group of channels or layers at least partially open along their length, plugging channels/layers of the second group at or near a first end and leaving a second end of the plugged channels at least partially open and washcoating the substrate after plugging the second group of channels, or alternatively, washcoating the substrate to plug the second group of channels/layers. The method may further include forming flow restrictors in the first group of channels at or near an outlet end of each channel, which may include additional washcoating to partially or substantially block the first group of channels/layers. Alternatively, the method may include placing washcoated fibers or fleece between selected layers to form flow restrictors.

The present disclosure includes embodiments having various advantages. For example, embodiments of the present disclosure provide improved soot management and back pressure management with better mixing and diffusion of exhaust gas to compensate for slower reaction kinetics so that NOx tip-in spikes can be better managed.

The above advantages and other advantages and features will be readily apparent from the following detailed description of the preferred embodiments when taken in connection with the accompanying drawings.

DETAILED DESCRIPTION OF THE PREFERRED EMBODIMENT(S)

As those of ordinary skill in the art will understand, various features of the embodiments illustrated and described with reference to any one of the Figures may be combined with features illustrated in one or more other Figures to produce alternative embodiments that are not explicitly illustrated or described. The combinations of features illustrated provide representative embodiments for typical applications. However, various combinations and modifications of the features consistent with the teachings of the present disclosure may be desired for particular applications or implementations.

Figure 1:
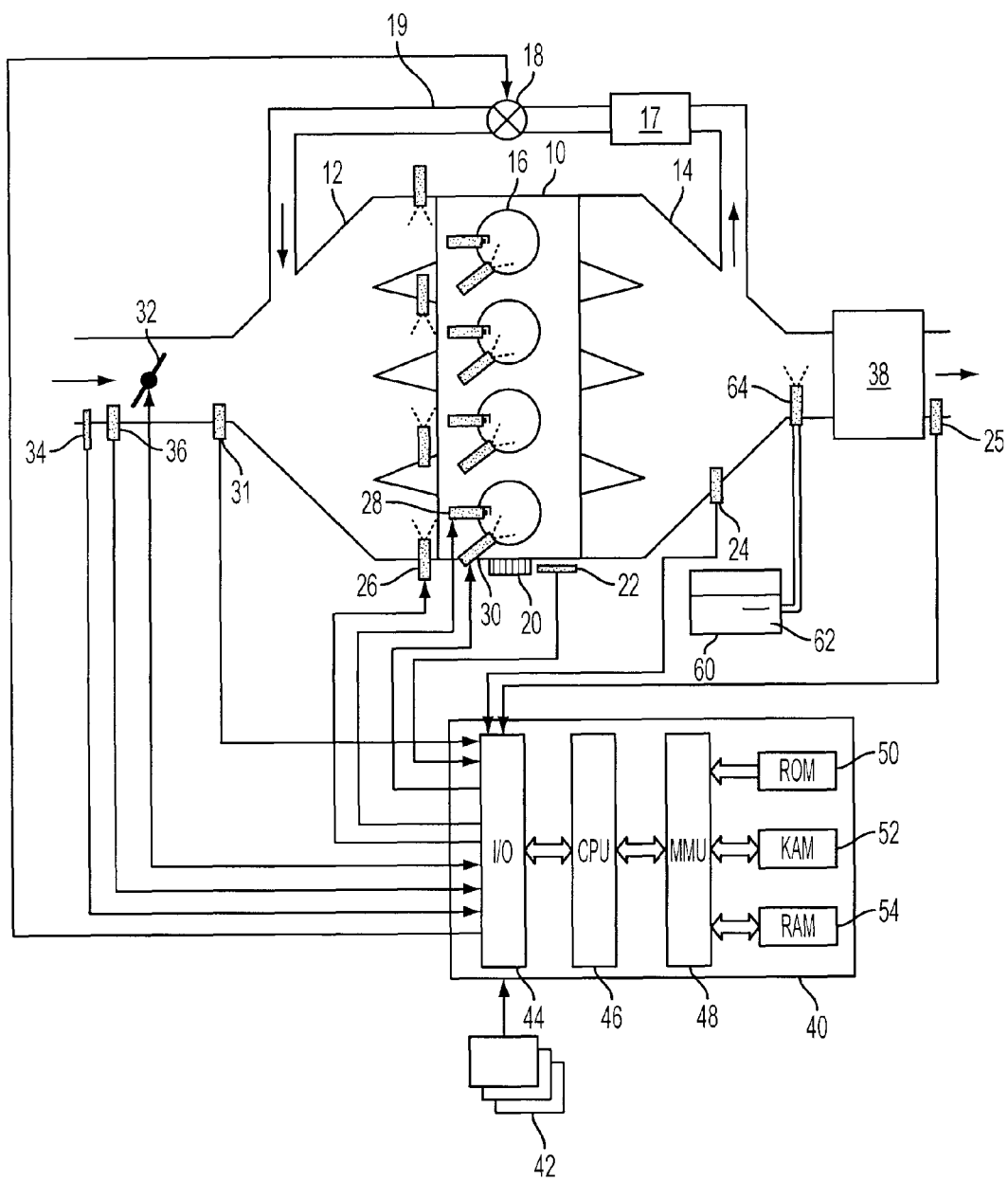
FIG. 1 is a schematic of an engine equipped with an exhaust treatment device according to one embodiment of the present disclosure.

A four cylinder internal combustion engine 10 is shown by way of example in FIG. 1. Air is supplied to engine 10 through intake manifold 12 with spent gases discharged through exhaust manifold 14. An intake duct upstream of intake manifold 12 contains a throttle valve 32 which, when actuated, controls the amount of airflow to engine 10.

Two sensors 34 and 36 installed in intake manifold 12 measure air temperature and mass air flow (MAF), respectively. A sensor 31, located in intake manifold 14 downstream of throttle valve 32, is a manifold absolute pressure (MAP) sensor. A partially closed throttle valve 32 causes a pressure depression in intake manifold 12. When a pressure depression exists in intake manifold 12, exhaust gases are caused to flow through exhaust gas recirculation (EGR) duct 19, which connects exhaust manifold 14 to intake manifold 12. EGR valve 18 is positioned within duct 19 and is actuated to control EGR flow, which passes through optional intercooler 17 to cool the EGR flow.

Fuel injectors 26 supply fuel to engine 10 in a port fuel injected embodiment as illustrated. In a direct injection embodiment, fuel is supplied directly to a corresponding cylinder rather than to the intake ports. Although it is typical for fuel to be supplied by one or the other of port injectors 26 or direct fuel injectors 30, other alternatives include: carburetion (not shown because such carburetor would be located upstream of throttle valve 32) and any combination of carburetion, port injection, and direct injection. Each cylinder 16 of engine 10 contains a spark plug 26 in embodiments using spark ignition. Alternatively, engine 10 may be a diesel or compression ignition engine in which ignition spontaneously occurs upon compression and in which glow plugs (not shown) or similar devices may be used to heat the cylinders during engine starting. The crankshaft (not shown) of engine 10 is coupled to a toothed wheel 20. Sensor 22, placed proximately to toothed wheel 20, detects engine 10 rotation.

Continuing to refer to FIG. 1, electronic control unit (ECU) 40 controls engine 10. ECU 40 has a microprocessor 46, called a central processing unit (CPU), in communication with memory management unit (MMU) 48. MMU 48 controls the movement of data among the various computer readable storage media and communicates data to and from CPU 46. The computer readable storage media preferably include volatile and nonvolatile storage in read-only memory (ROM) 50, random-access memory (RAM) 54, and keep-alive memory (KAM) 52, for example. KAM 52 may be used to store various operating variables while CPU 46 is powered down. The computer-readable storage media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by CPU 46 in controlling the engine or vehicle into which the engine is mounted. The computer-readable storage media may also include floppy disks, CD-ROMs, hard disks, and the like. CPU 46 communicates with various sensors and actuators via an input/output (I/O) interface 44. Examples of items that are actuated under control by CPU 46, through I/O interface 44, are fuel injection timing, fuel injection rate, fuel injection duration, throttle valve 32 position, spark plug 26 timing (for spark-ignition embodiments), EGR valve 18 position, and urea injector 64 timing and duration. Various other sensors 42 and specific sensors (engine speed sensor 22, in-line torque sensor, cylinder pressure transducer sensor, engine coolant sensor 38, manifold absolute pressure sensor 31, exhaust gas component sensors 24 and 25, air temperature sensor 34, and mass airflow sensor 36) communicate input through I/O interface 44 and provide signals from which engine rotational speed, vehicle speed, coolant temperature, manifold pressure, pedal position, cylinder pressure, throttle valve position, air temperature, exhaust temperature, exhaust stoichiometry, exhaust gas constituent concentration, and air flow can be computed. Some architectures for ECU 40 do not contain MMU 48. If no MMU 48 is employed, CPU 46 manages data and connects directly to ROM 50, RAM 54, and KAM 52. The present invention could utilize more than one CPU 46 to provide engine control and ECU 60 may contain multiple ROM 50, RAM 54, and KAM 52 coupled to MMU 48 or CPU 46 depending upon the particular application.

Continuing with FIG. 1, exhaust gases from engine 10 pass through exhaust treatment device 38. Sensor 24, in exhaust manifold 14 located upstream of exhaust treatment device 38, is an exhaust gas component sensor. In one embodiment, exhaust treatment device 38, is a SCR catalyst. Urea tank 60 contains urea 62 which is supplied to the engine exhaust through injector 64. Urea injector 64 is controlled by ECU 40 (electrical connection between the two not shown). Downstream of SCR 38 is exhaust gas component sensor 25, which senses ammonia. Urea 62 is supplied to SCR 38 to cause NOx to react to N2 and O2. It is desirable to provide no more urea 62 to SCR 38 than is reacted within SCR 38. Unreacted urea 62 breaking through SCR 38 is detected by sensor 25. Urea injector 64 can be feedback controlled using sensor 25 to avoid urea 62 breakthrough.

Exhaust treatment device 38, shown in FIG. 1, is alternatively a LNT. In this embodiment, sensors 24 and 25 are NOx sensors. Alternatively, sensor 24 is a wide-range exhaust gas oxygen sensor or a combination NOx and wide-range exhaust gas oxygen sensor.

As shown in FIG. 1, engine 10 is naturally aspirated. However, the present invention is not limited to naturally-aspirated engines. The present invention is compatible with pressure charging of the intake gases as accomplished by a turbocharger, supercharger, or any combination of these devices and other known pressure charging devices.

Figure 2:
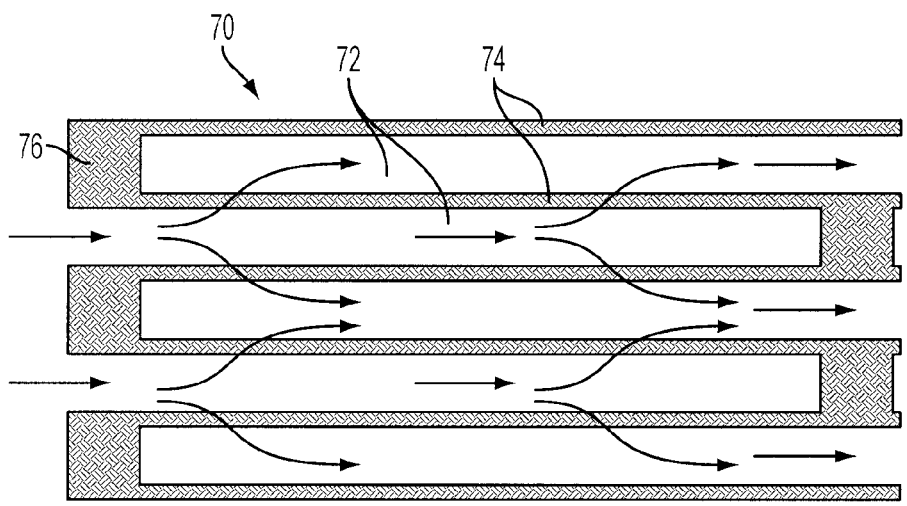
FIG. 2 is a schematic of a diesel particulate filter of the prior art.

In FIG. 2, a schematic of a portion of a prior art diesel particulate filter (DPF) substrate 70 is shown. DPFs are known to contain multiple, parallel channels 72. Half of the channels contain plugs 76 at a first end while the remaining channels 72 are open at the first end, but blocked at the opposite end. As such, every channel is blocked at one end or the other. Walls 74 of channels 72 are porous to allow gases to pass through, but particulate matter (soot) is trapped on walls 74. As can be seen in FIG. 2, the exhaust gas must pass through a wall 74 to exit substrate 70. Thereby, all exhaust gases are filtered and none of the exhaust gases exit the DPF through the channels that are open at the upstream end. DPFs are known to be constructed of cordierite and of silicon carbide.

Figure 3:
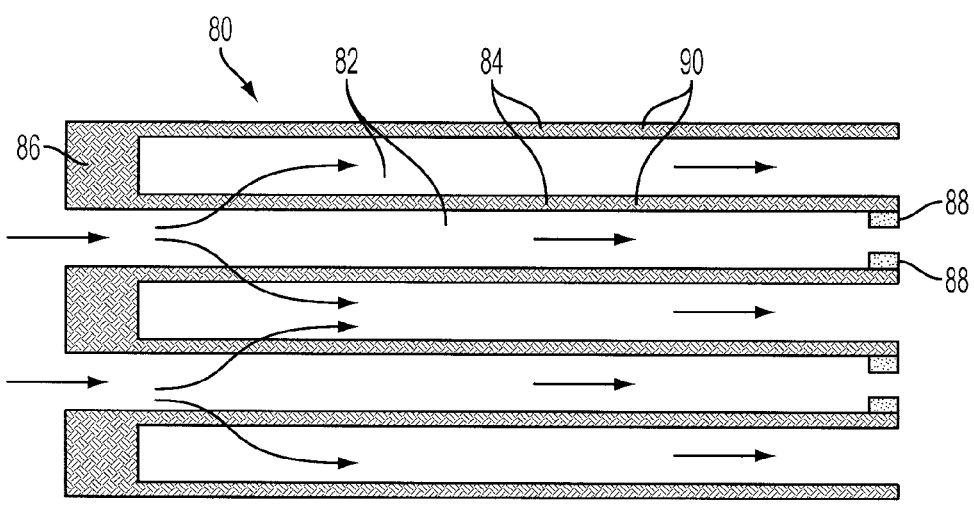
FIG. 3 is a schematic of one embodiment of a SCR catalyst according to the present disclosure.

In contrast to a DPF, one embodiment of an exhaust treatment device according to the present disclosure is illustrated in FIG. 3. Substrate 80, made of cordierite, contains multiple, parallel channels 82 with porous walls 84. A first group of channels ranging from about one-third to one-half of channels 82 contain plugs 86 at one end. Plugs 86 allow almost no soot to pass through, but are porous enough to allow some smaller molecules, such as ammonia, NH3, to pass. In one embodiment, the plugs are made of the substrate material. But, because they are thicker than the walls, they provide a greater barrier to larger particles such as soot to pass. In contrast to a DPF, substrate 80 includes a second group of channels 82 that have both ends at least partially open, i.e. do not have plugs, but may include flow restricting elements. Substrate 80 contains a washcoat 90. Some of the inlet gases traverse substrate 80 without passing through walls 84. Some gases do pass through walls 84 prior to exiting substrate 80. To encourage more flow through walls 84, one embodiment includes flow restrictors 88 at or near an outlet end of each unplugged channel to increase pressure drop in unplugged channels. Flow restrictors 88 only partially block the channels allowing some exhaust gas to exit. Flow restrictors may be formed by washcoat materials in a subsequent washcoating or dipping process that deposits additional washcoating materials in selected channels. In contrast to flow restrictors, plugs 86 extend substantially completely across the cross-section of the channel to occlude the channel or layer. In another embodiment illustrated and described with reference to FIG. 13, the first group of channels or layers includes coated metallic fibers or fleece disposed along at least a portion of the channel length to restrict flow and increase through-wall diffusion from the first (primary) group of channels to the second (secondary) group of channels. Alternatively, or in combination, flow diverters or scoops may be provided as illustrated and described with reference to FIG. 14 to redirect a portion of the flow from the first group or primary channels to the second group or secondary channels.

Figure 12:
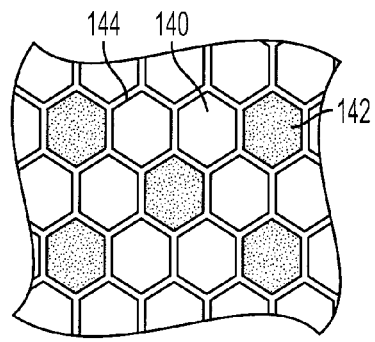

In one embodiment, the primary channel walls, i.e., without plugs, have a washcoat 90. Secondary channels, i.e., those containing plugs, are impregnated with the washcoat materials. In this way, three diffusion and kinetic mechanisms favoring NOx conversion are encouraged: primary channel flow, secondary channel flow, and very slow packed bed flow through the substrate wall. To this end, it is desirable to have small channels: preferably above 39 cells per square centimeter (250 cells per square inch). Furthermore, to facilitate flow through walls 84, porous walls (greater than 50% porosity) are desired. It is desirable to have the ratio of primary flow (through non-plugged channels) to secondary flow (through plugged channels) to be around the ratio of 2:1. One alternative is to select the porosity to provide such a flow ratio. Another alternative is to provide a cell geometry and/or size that facilitate a desired ratio. As illustrated in FIG. 12, for example, a hexagonal cell geometry facilitates formation of a 2:1 ratio of the number of channels in the first group relative to the number of channels in the second group.

To further encourage flow into and through wall 84, the length of substrate 80 is extended as much as possible within manufacturing feasibility, i.e., to avoid substrate cracking. A long substrate increases back pressure and encourages cross-flow diffusion and kinetics. Preferably, the substrate length is more than 1.5 times the diameter of the substrate. This provides an alternative or complementary embodiment to the use of restrictors 82.

In yet another embodiment, primary channels (no plugs) utilize coarser grain washcoat and thicker walls, whereas secondary channels (with plugs) utilize finer grain washcoat and thinner walls. Furthermore, secondary channels are less than fully coated to encourage cross-flow.

In a preferred embodiment, substrate 80 is coated with an acidic material, such acidic material selected to render substrate 80 an SCR. There are many different and evolving SCR washcoats which are suitable depending on activation temperature, maximum temperature, porosity requirements, contamination, etc. The application of these washcoats to maximize wall-flow diffusion by regions, thicknesses, and zone coating are contemplated by the present inventors and a part of this disclosure.

Figure 4:
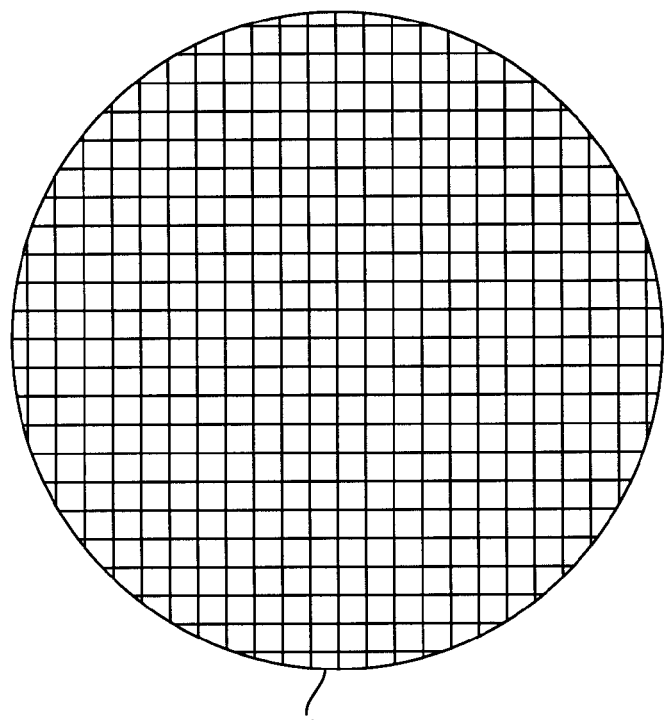
FIG. 4 shows an upstream end and a downstream end of one embodiment of a SCR catalyst according to the present disclosure.
Figure 4:
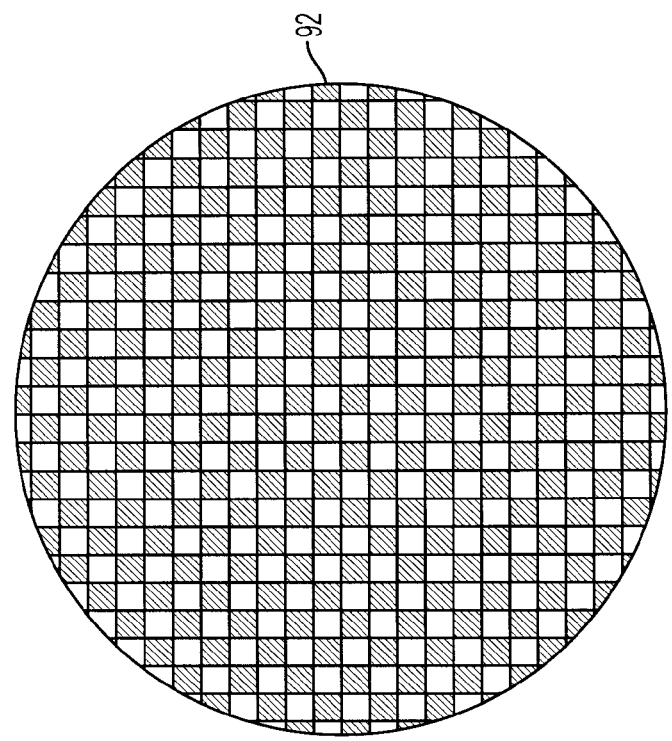

An upstream cross-section 92 of substrate 80 is shown in FIG. 4, in which the cross-section of the channels are square and every other channel is plugged, as in a checkerboard fashion. Also in FIG. 4 is the downstream cross-section of substrate 80, in which no channels are plugged. The illustration in FIG. 4 is for example only and not intended to be limiting. Alternatively, the channels are hexagonal or other tessellating shapes as illustrated and described with reference to FIGS. 9-13.

In the example shown in FIG. 4, half of the channels are plugged. However, alternatively less than half of the channels are plugged. In yet another alternative, more than half of the channels are plugged, which increases diffusion by increasing pressure drop.

Figure 5:
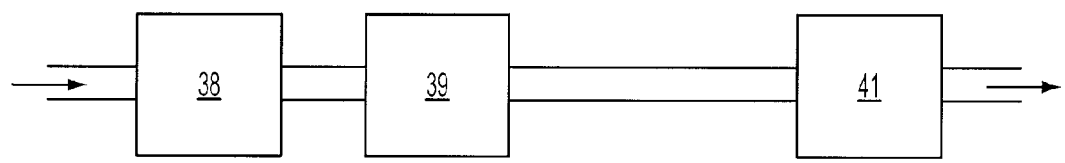
FIG. 5 is a schematic showing a series of treatment devices according to one embodiment of the present disclosure.

Multiple treatment units 38, 39, and 41 are shown in FIG. 5. In one embodiment, units 38, 39, and 41 contain substrates 80 according to the present invention. Alternatively, treatment unit 39 is a conventional SCR and treatment unit 41 is a conventional TWC (three-way catalyst). The present disclosure contemplates many alternatives in which devices 39 and 41 are any of a LNT, SCR, DPF, TWC, and diesel oxidation catalyst (DOC) to achieve an overall highly efficient catalyst system.

Figure 6:
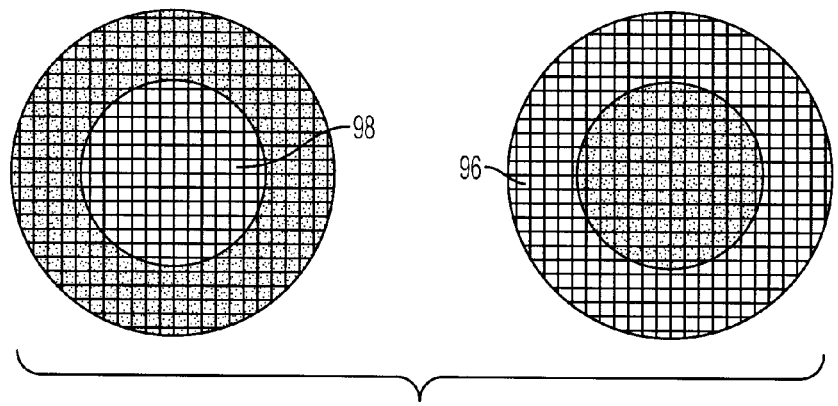
FIG. 6 shows upstream ends of two serial SCR catalysts according to an embodiment of the present disclosure.

In FIG. 6, two SCRs of the present invention are shown in which the upstream face 96 of one of the units has all the interior channels plugged and all of the exterior channels unplugged. Directly behind an SCR of this configuration is a second SCR in which the upstream face 98 has all interior channels unplugged and the exterior channels plugged. This configuration causes flow to traverse the exterior channels toward the interior channels as it moves from the first SCR to the second SCR.

In an alternative embodiment, substrate 80 has alternately tapered channels such that crossover flow is encouraged. In particular, the non-plugged channels are wider and have a larger cross-sectional flow area at an upstream end and reduce in diameter/cross-sectional area along the length of the substrate toward a downstream or outlet end. The plugged channels increase in diameter/cross-sectional flow area from the plugged end to the non-plugged end. Of course, the channels may also taper along a first portion and become parallel along a second portion depending upon the particular application and implementation.

In yet another alternate embodiment, substrate 80 is made of silicon carbide. Silicon carbide is known to be less brittle, thus more durable, than cordierite, with a penalty of higher cost and weight. Silicon carbide, being more durable, is more able to be extruded to a longer length. A longer length allows more opportunity for diffusion. A length of at least 1.5 times the diameter is preferred.

It is desirable to decrease the size of substrate 80 to facilitate packaging. The cross-sectional size of substrate 80 is designed such that a tolerable pressure drop across substrate 80 is experienced at the highest flow conditions. In one embodiment, fewer than half of the channels are plugged at one end. It is desirable that each open channel have contact with at least one plugged channel, encouraging flow through the walls. By plugging fewer than half of the channels, flow through substrate 80 is restricted less than if half are plugged. The advantage is that the cross-sectional area of substrate 80 can be reduced. Alternatively, by plugging more than half of the channels, the pressure drop is increased, thereby promoting better diffusion.

In FIG. 3, flow is shown entering at the end containing plugs 86. This is desirable for an application in which particulate matter may be present in the exhaust gases, such as a diesel engine application. If plugs 86 were installed in the downstream end of the substrate 80, particulate matter would collect in substrate 80. It is intended to filter particulate matter in a DPF in which collected particles are regularly incinerated to regenerate the DPF. If there is no intention of regenerating substrate 80, it is desirable to avoid collection of particles by adopting the orientation shown in FIG. 3. In another embodiment in which there are few particles, such as a gasoline engine, it may be found to be advantageous to place substrate 80 in the flow in the opposite direction to that shown in FIG. 3.

In one preferred embodiment, substrate 80 contains a washcoat 90 which causes it to function as a SCR. An injector 64 coupled to a urea tank 62 (injector and tank shown in FIG. 1) sprays an initial aqueous solution containing dissolved NH3. Under exhaust heat and reaction with water in the exhaust, the NH3 typically attaches to the acidic sites of the SCR wash coat. The urea solution coats and saturates substrate 80 and upon adsorption leaves the solid acidic matter on the surface of substrate 80 as well as inside the porous walls and eventually on secondary walls as well. In general, NH3 is both physio-adsorbed and chemi-adsorbed. In use, the acidic material attracts the reductant, which is alkaline or basic in nature. In the case of an SCR, urea converted to NH3 is typically the reductant material. The reductant is adsorbed on the solid acidic material of the washcoat and is available to react with NOx on a continuous basis.

Figure 7:
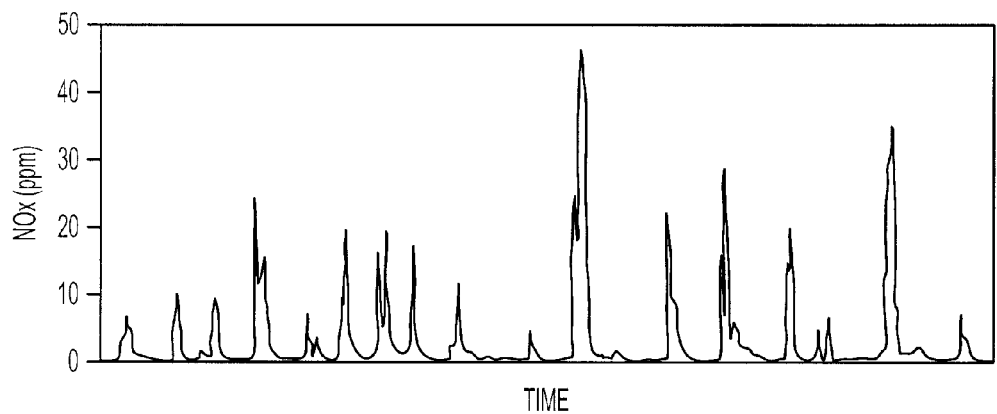
FIG. 7 is a graph of tailpipe NOx concentration from a diesel vehicle during a drive cycle, the treatment system of the diesel engine comprising a SCR catalyst according to the prior art.
Figure 8:
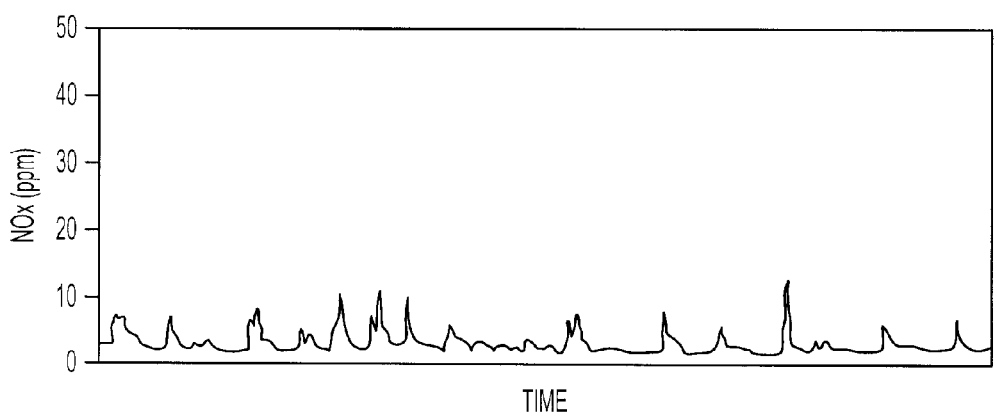
FIG. 8 is a graph of tailpipe NOx concentration from a diesel vehicle during a drive cycle, the treatment system of the diesel engine comprising a SCR catalyst according to one embodiment of the present disclosure.

Referring to FIGS. 7 and 8, the NOx concentration at the tailpipe of a diesel engine equipped vehicle is shown for a prior art SCR (FIG. 7) and one embodiment of a SCR according to the present disclosure (FIG. 8). The spikes in both figures correspond to tip-ins, e.g. driver demand for additional torque for acceleration, hill climb, highway passing, or other purposes. The magnitude of the spikes in FIG. 8 is greatly diminished relative to spikes shown in FIG. 7. The resulting NOx emission over the drive cycle for a SCR embodiment according to the present disclosure is a marked improvement over the prior art.

Alternatively, substrate 80 has a LNT washcoat 90. Such washcoat contains three components: a first component that facilitates oxidation of NO to NO2, a second component that traps NO2 on the surface (NO2 forming a nitrate on the surface), and a third component of precious metals, often rhodium, which reduces released NOx (under rich operating conditions) to N2.

In another alternative, substrate 80 is used in place of traditional gasoline TWC substrates. This provides a precious metal cost savings due to the enhanced diffusion and kinetics over traditional channel flow designs of TWCs. This embodiment provides diminished tip-in emission spikes.

Figure 9:
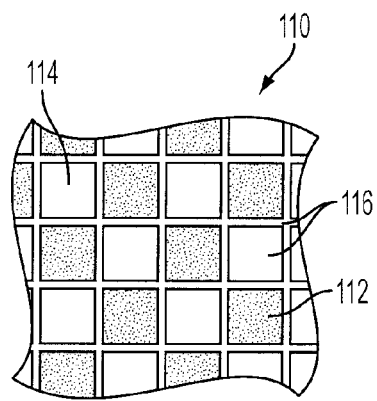
FIGS. 9-12 illustrate representative cross-sectional geometries and sizes for a treatment device according to embodiments of the present disclosure.

FIGS. 9-12 illustrate partial cross-sections of representative geometries/sizes of cells for an emission treatment device according to the present disclosure. Similar to the embodiments illustrated in FIGS. 4 and 6, FIG. 9, illustrates generally square cross-sectional channels 110 with a first group of channels with one end blocked or plugged, as represented by channel 112. Channels 112 include an opposite open end (not shown) as previously described. A second group of channels, represented by channel 114, includes channels at least partially open along their entire length. The primary channels 116 and secondary channels 112 are substantially equal in number with some variation occurring due to the overall geometry of the emission treatment device. Open or primary channels 114 may include flow restriction elements as previously described, or as described with reference to FIGS. 13 and 14, to increase cross-channel flow of exhaust gas through the walls of substrate 116. Flow restriction elements may be comprised of washcoat material and/or substrate material.

Figure 10:
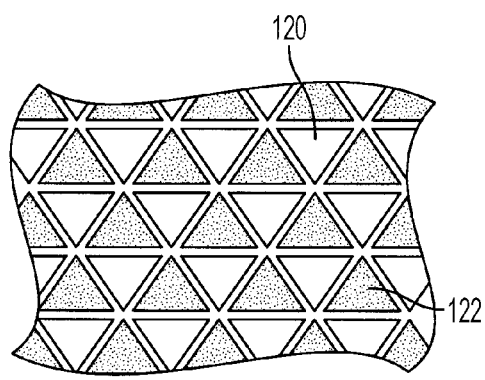

FIG. 10 illustrates an alternative tessellating geometry for primary channels 120 and secondary channels 122. In the embodiment of FIG. 10, primary channels 120 and secondary channels 122 have a generally triangular cross-sectional geometry of similar size approximately equal in number. Similar to previously described embodiments, primary channels 120 allow at least some end-to-end flow, i.e. are at least partially open along their entire length, while secondary channels 122 are blocked or restricted to a greater degree relative to the primary channels to facilitate flow into the primary channels and through the substrate walls to the secondary channels as illustrated and described in greater detail with reference to FIGS. 13 and 14.

Figure 11:
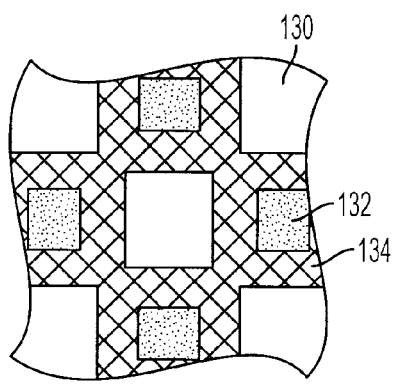

FIG. 11 is a partial cross-section illustrating primary channels 130 and secondary channels 132 having similar geometries of different sizes. Substrate 134 forms thicker walls surrounding secondary channels 132 to create smaller channels having a square or rectangular cross-section. Primary channels 130 include flow restricting elements (not shown) to increase flow from primary channels 130 through substrate walls 134 to secondary channels 132.

FIG. 12 illustrates another tessellating geometry for primary channels 140 and secondary channels 142 that provides volumetric efficiency and facilitating control of the ratio of the number of primary to secondary channels. Substrate 144 forms a hexagonal shape cross-section that provides about twice as many primary channels 140 as secondary channels 142 with each secondary channel 142 surrounded by primary channels 140.

Those of ordinary skill in the art will appreciate that the representative tessellating geometries illustrated provide improved volumetric efficiency, but various other geometries that are not explicitly described or illustrated may be suitable for particular applications or implementations based on the teachings of the present disclosure. Similarly, more than one cell geometry and/or size may be used in combination. Complementary geometries and/or sizes may be used to provide a desired conversion efficiency and volumetric efficiency by providing a desired ratio of primary to secondary channels. Those of ordinary skill in the art will also recognize that the number ratio or volume ratio of primary to secondary channels may be different from or opposite to that illustrated and described with reference to FIGS. 9-12.

Figure 13:
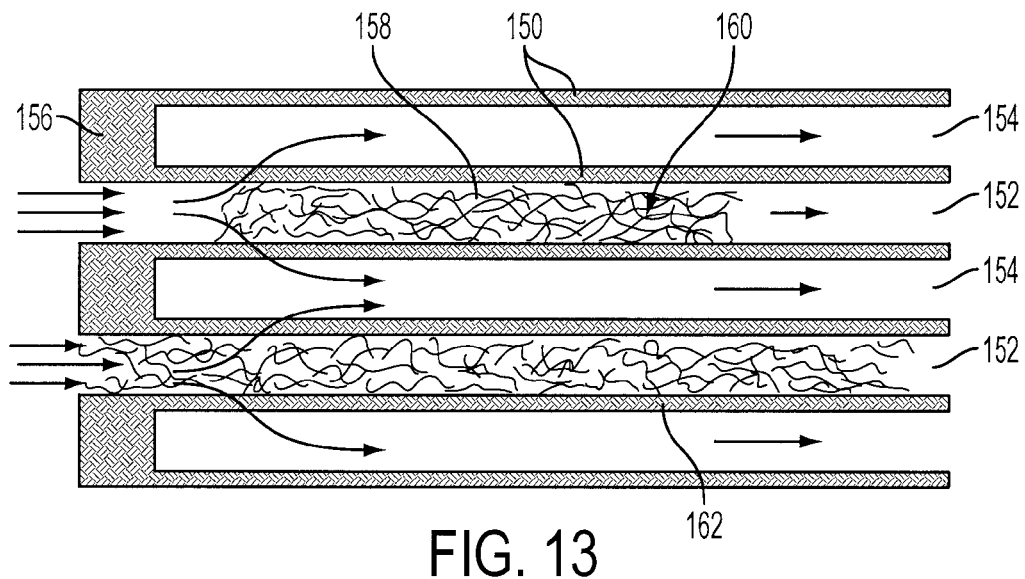
FIG. 13 illustrates a method/device for facilitating through-wall flow in an exhaust treatment device according to one embodiment of the present disclosure.

Another embodiment of an exhaust treatment device according to the present disclosure is illustrated in FIG. 13. In the cross-section of FIG. 13, substrate 150 forms multiple parallel layers or lamina that include primary layers 152 that are at least partially open along their entire length and secondary layers 154 that are substantially blocked or plugged as indicated at 156. Substrate 156 may be made of a porous material, such as cordierite or silicon carbide as previously described, or may be a thin metallic mesh made of stainless steel, for example. Catalyzed mesh sheets may be supported by perforated stainless steel sheets containing small passages and/or scoops to complement the useful wallflow by structure and flow design. A plurality of washcoated fibers or fleece 158 is disposed within primary layers 152. Fleece 158 increases the surface area exposed to exhaust flowing through primary channels 152 while acting as a flow restricting element to increase back pressure to facilitate trans-layer migration of exhaust gas through substrate 150 into secondary layers 154.

Depending on the particular application and implementation, washcoated fleece 158 may be disposed in a predetermined portion or region of the layer as indicated by reference numeral 160, or may extend the entire length of the layer as indicated by reference numeral 162. Alternatively, or in combination with selected placement of the fleece, the density of fibers may vary along the length and/or width of the layer to provide a desired amount of through-layer and trans-layer flow. For example, secondary layers 154 may also contain fleece along at least a portion of their length and/or width having relatively fewer fibers per unit volume than the fleece contained in primary channels 152, which would have a greater density or higher number of fibers per unit volume.

Figure 14:
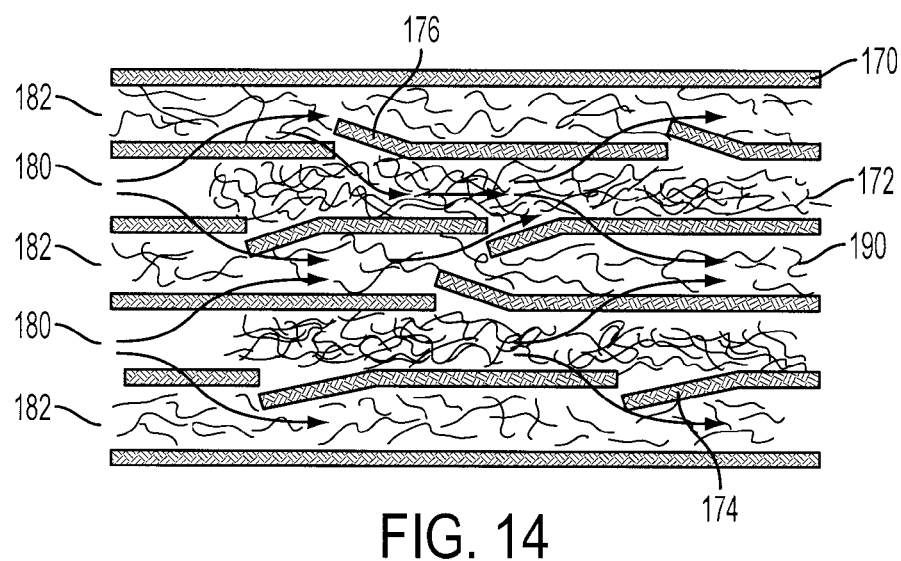
FIG. 14 illustrates another alternative method/device for treating exhaust from an internal combustion engine according to the present disclosure.

A partial cross-section of another embodiment of an emissions treatment device according to the present disclosure is shown in FIG. 14. Substrate 170 forms multiple generally parallel layers with washcoated fibers or fleece 172 interposed adjacent layers to facilitate trans-layer migration of exhaust flow through corresponding openings of substrate 170. Substrate 170 may be made of a thin metallic mesh, such as stainless steel, and may include a plurality of flow diverters or scoops 174, 176 that divert a portion of exhaust from one layer to an adjacent layer. Alternatively, substrate 170 may be made of silicon carbide, cordierite, or other suitable material to facilitate trans-layer flow of exhaust. Layers may be designated as primary layers 180 or secondary layers 182 with primary layers having washcoated fleece 172 of higher density and/or different placement relative to washcoated fleece 190 in secondary layers 182 to facilitate trans-layer or packed bed flow of exhaust from primary layers 180 to adjacent secondary layers 182. Primary layers 180 and/or secondary layers 182 may also have fleece of varying density to provide a desired flow path or distribution of exhaust through the treatment device. For example, some or all of primary layers 180 may include a first entry portion with few or no fibers followed by a region of densely packed fibers or fleece to reduce exhaust flow velocity and redirect a portion of the exhaust flow through substrate 170 to adjacent secondary layers 182. Similarly, fiber density may be increased near flow diverters or scoops 174, 176 to provide a desired exhaust flow distribution.

In the embodiment illustrated in FIG. 14, both primary layers 180 and secondary layers 182 are at least partially open at both ends. Although illustrated as substantially evenly spaced, primary layers 180 and secondary layers 182 may have different spacing to provide a desired flow distribution among the various layers.

Various embodiments of the present disclosure may also be useful in non-automotive applications where diffusion, slow kinetics, and transients are problematic for catalysis, synthesis, and other chemical processes.

As such, embodiments of the present invention overcome the low NOx conversion efficiency of prior art SCRs during transient engine operation by using a substrate comprised of multiple, porous, parallel channels or layers in which about half of the channels or layers are substantially blocked or plugged, preferably on an upstream end. The substrate may be made of cordierite, silicon carbide, or a thin metallic mesh, such as a stainless steel mesh, with porosity greater than 10%, but preferably 35% to 65%. The emissions treatment device is placed in an engine exhaust preferably with the end having plugged or blocked layers or channels closer to the engine. The substrate and/or embedded fibers or fleece are wash coated with copper zeolite or other SCR type coatings which provide molecular storage of NH3 for the reduction of NOx.

Various embodiments include a substrate containing 10 to 100 cells per square centimeter (75 to 600 cells per square inch), with greater than 40 cells per square centimeter (250 cells per square inch) being preferred.

A SCR according to the present disclosure provides superior control of NOx during transient operating conditions compared to prior art SCRs when equipped on a diesel vehicle (FIGS. 7 and 8). The NOx breakthrough during transients is reduced one-third to over three-fourths depending on the nature of the tip-in. By controlling transient emissions, an SCR embodiment according to the present disclosure halved overall diesel cycle NOx emissions as compared to the prior art. Additionally, this concept improves steady state NOx efficiency by providing improved diffusion and subsequent kinetics by the effective storage mechanisms having a deeper penetration into and through the washcoat material applied to either or both sides of the porous substrate material, and or embedded fibers/fleece. Washcoats and their placement in the channels/layers can be varied to facilitate cross flow from the primary to the secondary channels/layers. Traditional channel flow diffusion and kinetics with a shared packed bed or wall flow diffusion and kinetics are coupled according to the present disclosure to facilitate more efficient NOx conversion.

While the best mode has been described in detail, those familiar with the art will recognize various alternative designs and embodiments within the scope of the following claims.

What is claimed:

1. An emissions treatment device for an internal combustion engine, the device comprising:
    a porous substrate forming a plurality of channels including a first group of channels at least partially open on both upstream and downstream ends and a second group of channels substantially closed at one end and at least partially open at an opposite end, wherein each channel has a polygonal cross-section perpendicular to flow through the device and wherein each of the first group of channels includes a flow restrictor at one end, the flow restrictors comprised of washcoat material deposited only near one end of the channels.

2. The emissions treatment device of claim 1 wherein the first and second groups of channels have the same polygonal cross-section with each channel in the first group having a larger cross-sectional area than each channel in the second group.

3. The emissions treatment device of claim 1 wherein the first group of channels are concentrically positioned relative to the second group of channels.

4. The emissions treatment device of claim 1 further comprising washcoated fibers disposed within the first group of channels.

5. The emissions treatment device of claim 1 wherein each of the plurality of channels has a hexagonal cross-sectional area.

6. The emissions treatment device of claim 5 wherein the first group of channels includes about twice as many channels as the second group of channels.

7. The emissions treatment device of claim 6 wherein each channel in the first group of channels is surrounded by channels belonging to the second group of channels.

8. An emission treatment device comprising
    a porous substrate defining, a first group of layers at least partially open on both upstream and downstream ends and a second group of layers substantially blocked only near one end by washcoated fibers and at least partially open at an opposite end; and
        washcoated fibers disposed within at least some of the layers to increase back pressure and facilitate exhaust flow through the substrate to adjacent layers.

9. The emissions treatment device of claim 8 wherein the porous substrate comprises a plurality of stainless steel mesh sheets.

10. The emissions treatment device of claim 8 wherein the porous substrate comprises a plurality of washcoated stainless steel mesh sheets.

11. The emissions treatment device of claim 8 wherein the substrate includes a plurality of flow diverters that extend into an exhaust flow path to divert exhaust flow from one layer to an adjacent layer.

12. The emissions treatment device of claim 8 wherein the first group of layers includes washcoated fibers having a density greater than the density of washcoated fibers in the second group of layers.

13. The emissions treatment device of claim 8 wherein layers of the second group of layers are substantially blocked near one end by washcoat material deposited on the substrate.

14. The emissions treatment device of claim 8 wherein the washcoated fibers extend along only a portion of the substrate length.

15. The emissions treatment device of claim 8 wherein the washcoated fibers are disposed within layers of only one of the first group and second group of layers, and wherein layers of the first group are separated by at least one layer of the second group.

* * * * *